UNITED STATES PATENT OFFICE 2,567,135

VULCANIZATION OF BUTADIENE COPOLYMER RUBBERS

Bernard M. Sturgis, Pitman, N. J., and Arthur A. Baum, Wilmington, Del., assignors to E. I. du Pont de Nemours & Company, Wilmington, Del., a corporation of Delaware No Drawing. Application August 6, 1946, Serial No. 688,688

2 Claims. (Cl. 260—85.1)

This invention relates to the vulcanization of butadiene copolymer rubbers. The invention relates more particularly to a process of vulcanizing butadiene copolymer rubbers by means of chlorine containing aryl methyl compounds.

It is an object of this invention to provide an improved process for vulcanizing butadiene copolymer rubbers. Another object of the invention is to provide a process whereby butadiene copolymer rubbers can be vulcanized in the absence of sulfur. A still further object is to provide vulcanized butadiene copolymer rubbers having improved properties.

By butadiene copolymer rubbers, we mean polymers having rubber-like properties which are produced by the copolymerization of butadiene with one or more copolymerizable vinyl compounds such as styrene or acrylonitrile, the butadiene being present in the mixture to the extent of from 50% to 98% of the total polymerizable material. The butadiene-styrene copolymer rubbers are manufactured commercially under such names as GR–S, GR–S–10, GR–S–25, GR–S–50 and the like which are the designations given to this type of rubber by the U. S. government, while the butadiene-acrylonitrile copolymer rubbers are manufactured under such names as "Buna N," "Hycar OR," "Perbunan" and "Chemigum." The vulcanization of butadiene copolymer rubbers is usually carried out by heating them with sulfur in the presence of certain organic and inorganic accelerators. While the vulcanizates thus produced are satisfactory for many uses, they are unsatisfactory for others due to deficiencies in certain physical properties. For example, sulfur vulcanizates of these polymers are known to have quite poor resistance to heat aging. They tend to become short and brittle and unserviceable after only a relatively short time at elevated temperatures. This tendency serves to limit the usefulness of butadiene copolymer rubbers where elevated temperatures are encountered.

The use of sulfur as a vulcanizing agent for these polymers has been very thoroughly investigated, and a vast number of combinations of sulfur, metal oxides and accelerators have been tried. The desired improvements in vulcanizate properties have not been obtained by this means, however. In fact, it appears that some of the properties, such as age-resistance, particularly at elevated temperatures, are adversely affected by sulfur itself.

It is therefore highly desirable to provide an improved method of vulcanizing butadiene copolymer rubbers, and particularly one in which sulfur is not used, which will give vulcanizates having somewhat different properties than those of sulfur vulcanizates and which especially will show improved resistance to aging.

We have now found that butadiene copolymer rubbers can be vulcanized by the use of aryl methyl compounds which contain at least one chlorine atom substituted in the methyl group. These compounds may be represented by the formula:

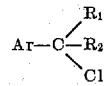

in which $R_1$ and $R_2$ may be either hydrogen or chlorine, and Ar represents an aromatic ring of the benzene or naphthalene series. The vulcanizing agents of our invention may be used in the complete absence of sulfur, and represent a new type of vulcanizing agent entirely different from any substances previously found to vulcanize either natural or synthetic rubber. By the use of these chlorine containing aryl methyl vulcanizing agents, vulcanizates can be obtained which are generally equal to, and in some properties superior to, those normally produced by sulfur vulcanization.

The vulcanizing agents of our invention are effective when used alone without any metal oxide or other accelerator or activator. They are activated by a number of metal oxides, however, and it is usually more practicable to use them in conjunction with such a metal oxide. Litharge is one of the most effective activators of this type.

Example 1 illustrates the use of a number of vulcanizing agents of our invention in the vulcanization of a butadiene-styrene copolymer rubber.

EXAMPLE 1

The following stocks were mixed on a rubber mill, using standard procedure.

| | |
|---|---|
| GR–S[1] | parts__ 100 |
| Medium processing carbon black | do____ 50 |
| Vulcanizing agent | As indicated |
| Litharge | As indicated |

[1] GR–S is the name of the butadiene copolymer rubber made in government plants by the copolymerization of butadiene and styrene.

Each mix was vulcanized for 30 minutes at 60 p. s. i. steam pressure, then the stress-strain characteristics of the resulting vulcanizates were determined. In the table, $M_{300}$ refers to stress in lbs./sq. in. at 300% elongation; $T_B$ refers to tensile strength at break in lbs./sq. in.; $E_B$ refers to per cent elongation at break.

Table I

| Vulcanizing Agent | Parts | Parts Litharge | $M_{300}$ | $T_B$ | $E_B$ |
|---|---|---|---|---|---|
| Benzyl chloride | 10 | 10 | 570 | 1,740 | 560 |
| 2,4-Dichloro benzyl chloride | 10 | 10 | 1,990 | 2,600 | 360 |
| 2,4,6-Trichlorobenzyl chloride | 10 | 10 | 1,990 | 2,350 | 330 |
| Benzal chloride | 10 | 10 | 740 | 2,160 | 560 |
| 2,6-Dichloro benzal chloride | 10 | 10 | 2,280 | 2,450 | 320 |
| Benzotrichloride | 2 | 20 | 600 | 1,310 | 500 |
| Do | 8 | 20 | 1,150 | 2,500 | 460 |
| o-Chlorobenzotrichloride | 10 |  | 770 | 1,690 | 500 |
| Do | 1 | 20 | 710 | 1,540 | 470 |
| Do | 2 | 10 | 1,580 | 2,820 | 420 |
| Do | 2.5 | 10 | 1,710 | 3,140 | 430 |
| Do | 2 | 20 | 2,200 | 2,490 | 320 |
| 2,4-Dichloro benzotrichloride | 10 | 10 |  | 2,280 | 280 |
| 1-Trichloromethyl naphthalene | 10 | 10 | 470 | 1,400 | 640 |

It can be seen from Table I that the amount of vulcanizing agent used can be varied over wide proportions. It is also seen that the use of a metal oxide activator is not necessary. The modulus can be varied over a wide range by varying the amount of vulcanizing agent and of metal oxide. If desired, very fast cures may be obtained.

Example 2 illustrates the use of other metal oxides as activators for this class of vulcanizing agent.

EXAMPLE 2

A series of vulcanizates were prepared, using the following base stock:

| | Parts |
|---|---|
| GR-S | 100 |
| Medium processing carbon black | 50 |
| o-Chlorobenzotrichloride | 10 |
| Metal oxide | 10 |

These mixes were vulcanized for 30 minutes at 60 p. s. i. steam pressure, and the stress-strain characteristics determined. Results were as follows:

Table II

| Activator | $M_{300}$ | $T_B$ | $E_B$ |
|---|---|---|---|
| None | 770 | 1,690 | 500 |
| Cerium dioxide | 1,000 | 2,040 | 450 |
| Copper oxide, black | 1,490 | 2,260 | 370 |
| Copper oxide, red | 1,170 | 2,790 | 500 |
| Red lead oxide | 2,190 | 2,690 | 330 |
| Lead peroxide |  | 1,420 | 200 |
| Litharge |  | 2,260 | 240 |
| Magnesium oxide | 1,340 | 2,390 | 420 |
| Magnesium peroxide | 1,150 | 1,770 | 400 |
| Manganese dioxide | 1,170 | 2,010 | 400 |
| Tellurium oxide | 1,420 | 1,540 | 320 |
| Zinc oxide | 1,020 | 2,500 | 510 |
| Zinc peroxide | 1,640 | 2,220 | 350 |

Certain other substances such as magnesium carbonate, calcium carbonate and lithopone are also effective as activators for o-chloro benzotrichloride.

EXAMPLE 3

In order to illustrate that other types of halogen containing aromatic compounds not possessing a:

group are not effective as vulcanizing agents for butadiene copolymer rubbers, the process of Example 1 was repeated with the compounds listed in the following table in place of the vulcanizing agents of our invention. It can be seen that the halogen containing compounds tested showed no vulcanizing action.

Table III

| Compound Tested | Parts | Parts Litharge | $M_{300}$ |
|---|---|---|---|
| Hexachlorobenzene | 5 | 10 | No cure. |
| Benzene hexachloride | 5 | 10 | Do. |
| Benzotrifluoride | 5 | 10 | Do. |
| 9,10-Dichloroanthracene | 10 | 10 | Do. |
| 2,4,6-Trichlorobenzotrifluoride | 10 | 10 | Do. |
| 2,4,6-Trichloromesitylene | 10 | 10 | Do. |
| 2,4,6-Tribromomesitylene | 10 | 10 | Do. |

The vulcanizing agents of our invention possess the advantage of giving a very flat cure. This property is quite desirable, since it permits vulcanizing thick articles to obtain approximately the same state of cure throughout the vulcanized article. This property is illustrated in the following example.

EXAMPLE 4

The following two stocks were mixed and vulcanized at 60 p. s. i. steam pressure. The vulcanizate properties were then determined.

| Stock | A | B |
|---|---|---|
| GR-S | 100 | 100 |
| Medium processing carbon black | 50 | 50 |
| o-Chloro benzotrichloride | 1.5 | 2.5 |
| Litharge | 20 | 20 |

| Vulcanization Time, Min. | Stress at 300% elongation, lbs./sq. in. | |
|---|---|---|
| 30 | 1,000 | 1,775 |
| 60 | 1,140 | 1,925 |
| 90 | 1,280 | 2,125 |
| | Tensile at break lbs. sq./in. | |
| 30 | 2,020 | 2,050 |
| 60 | 2,110 | 2,175 |
| 90 | 2,390 | 2,125 |
| | Per Cent Elongation at Break | |
| 30 | 450 | 335 |
| 60 | 420 | 340 |
| 90 | 430 | 300 |

Sulfur vulcanizates of butadiene-styrene copolymer rubbers are known to have poor resistance to heat aging. Exposure at temperatures such as 100° C. causes the vulcanizates rapidly to become brittle and to lose their usefulness. The deterioration is marked by a rapid rise in modulus and a decrease in elongation, so that after only a few days the vulcanizates become unserviceable for many uses. As the vulcanizates become hard and brittle, many other desired physical properties are also lost. It would therefore represent a distinct advance in the art if vulcanizates of butadiene-styrene copolymer rubbers could be produced which would retain their original properties after moderate periods of aging at elevated temperatures. This ideal is approached by the use of the chlorine containing aryl methyl compounds of our invention as vulcanizing agents. Vulcanizates produced with these vulcanizing agents show little, if any, increase in modulus or decrease in elongation after moderate aging at 100° C. These vulcanizates retain their original properties remarkably well, and are therefore suited for applications where high temperatures may be encountered. This is illustrated by the following example.

EXAMPLE 5

The following two stocks were compounded:

|  | C | D |
|---|---|---|
| GR-S | 100 | 100 |
| Medium processing carbon black | 50 | 50 |
| Zinc oxide | 5 | |
| Sulfur | 2 | |
| Zinc benzothiazyl mercaptide | 0.65 | |
| Diphenyl guanidine | 0.65 | |
| Litharge | | 20 |
| o-Chlorobenzotrichloride | | 2 |

Stock C is representative of a sulfur containing stock showing good heat resistance. It was vulcanized at 40 p. s. i. steam pressure. Stock D was vulcanized at 60 p. s. i. steam pressure to obtain a similar modulus. Portions of each vulcanizate, in the form of test pieces, were aged for 1 day at 100° C. in a circulating air oven. The vulcanizates were tested for stress-strain properties both before and after the aging period.

Table IV

STOCK C

| Time of Cure, min. | Stress at 300% elong. lbs./sq. in. | | | Per Cent Elongation at Break | | |
|---|---|---|---|---|---|---|
|  | Original | After 1 day at 100° C. | Per cent of Original | Original | After 1 day at 100° C. | Per cent of Original |
| 30 | 1,450 | 2,275 | 160 | 495 | 320 | 64 |
| 60 | 1,675 | 2,350 | 140 | 460 | 310 | 67 |
| 90 | 1,850 | 2,325 | 125 | 410 | 315 | 77 |

STOCK D

| Time of Cure, min. | Stress at 300% elong. lbs./sq. in. | | | Per Cent Elongation at Break | | |
|---|---|---|---|---|---|---|
|  | Original | After 1 day at 100° C. | Per cent of Original | Original | After 1 day at 100° C. | Per cent of Original |
| 30 | 1,125 | 1,150 | 102 | 365 | 375 | 103 |
| 60 | 1,600 | 1,525 | 95 | 375 | 325 | 87 |
| 90 | 1,850 | 1,550 | 83 | 320 | 330 | 103 |

The following example illustrates the vulcanization of a butadiene-acrylonitrile copolymer rubber.

EXAMPLE 6

The following base compound was used for these tests:

Perbunan[1] _____ parts__ 100
Medium processing carbon black ____ do____ 50
Litharge _____ As indicated
Vulcanizing agent _____ As indicated

[1] Perbunan is a butadiene copolymer rubber made by copolymerizing a mixture of butadiene and acrylonitrile.

The mixes were vulcanized for 30 minutes at 60 lbs./sq. in. steam pressure, then the stress-strain properties determined.

Table V

| Vulcanizing Agent | Parts | Parts Litharge | $M_{300}$ | $T_B$ | $E_B$ |
|---|---|---|---|---|---|
| p-Chlorobenzyl chloride | 5 | 10 | 730 | 2,510 | 560 |
| 2,6-Dichlorobenzal chloride | 5 | 10 | 1,950 | 2,180 | 320 |
| o-Chloro benzotrichloride | 1 | 10 | 770 | 2,320 | 520 |
| Do | 2 | 10 | 1,550 | 2,560 | 390 |
| Do | 5 | | 550 | 1,570 | 580 |
| None | | 10 | No cure | | |

Although certain definite chlorine containing aryl methyl compounds have been shown, these compounds are illustrative rather than limiting. In general, compounds of the structure:

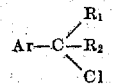

in which $R_1$ and $R_2$ are either hydrogen or chlorine, and Ar represents an aromatic ring of the benzene or naphthalene series, are effective vulcanizing agents for butadiene copolymer rubbers. The aromatic ring can be substituted with halogen or hydrocarbon groups. In fact, substitution of one or more chlorine atoms in the aromatic ring generally increases the effectiveness of the compound. The ring can also be substituted with alkyl groups of less than 13 carbon atoms, cycloalkyl groups, benzyl groups, or phenyl groups. Other examples of compounds falling within the scope of our invention are:

Penta-chloro-benzotrichloride
2,4-dibromobenzyl chloride
4-fluoro-benzotrichloride
4-methyl-benzotrichloride
2,4-dimethyl-benzal chloride
4-phenyl-benzotrichloride
4-benzyl-benzotrichloride
4-cyclohexyl-benzotrichloride
4-isobutyl-benzal-chloride
2-chloro-1-trichloromethyl naphthalene.

The vulcanizing agents of our invention may be used alone or together with a metal oxide. The amount of vulcanizing agent may be varied over quite wide limits, such as from 0.25 part to 20 parts for every 100 parts of polymer. The preferred range is from 0.5 to 10 parts of vulcanizing agent. The metal oxides, which are those which have heretofore been found useful in the vulcanization of these synthetic rubbers, may be used in amounts usually employed in the sulfur vulcanization processes. From 1 to 30 parts of such oxides, per 100 parts of polymer, may be employed with the vulcanizing agents of this invention. The vulcanizing agents of this invention may be used with any of the softeners, peptizing agents, fillers and other types of compounding ingredients commonly used with butadiene-styrene copolymer rubbers.

The most preferred vulcanizing agents of this series are o-chlorobenzotrichloride, benzotrichloride and 2,4-dichlorobenzyl chloride.

The chlorine containing aryl methyl compounds cause rapid vulcanization of butadiene copolymer rubbers in the absence of the usual vulcanization accelerators and are therefore unlike sulfur, which requires a vulcanization accelerator to bring about vulcanization at a practical rate. However, as pointed out above, metal oxides have been found to accelerate the action of these new vulcanizing agents. When sulfur is used alone with these vulcanizing agents, the speed of vulcanization is retarded and therefore these compounds are preferably used as vulcanizing agents per se in the absence of sulfur. Certain of these chlorine containing aryl methyl compounds, namely, the trichloromethyl aryl compounds, have been found to act as accelerator activators in the usual sulfur vulcanzation of various types of elastomers, but this action appears to be a distinctly different action than that exhibited when they are used as vulcanizing agents themselves, as in the present case. The acceleration of the sulfur vulcanization of elastomers by means of the trichloromethyl aryl compounds is covered in our co-pending application Serial No. 688,691, filed of even date herewith, now U. S. Patent 2,489,340.

The present invention provides an entirely new method for vulcanizing butadiene copolymer rubbers which enables departure from the use of sulfur, oxidizing agents and other similar vulcanizing agents which often are deleterious to the properties of the vulcanizates produced. This invention enables the production of new types of vulcanizates which show unusual properties. In particular, they are much more resistant to deterioration upon aging at elevated temperatures than are sulfur vulcanizates.

We claim:

1. A process of vulcanizing a butadiene-styrene copolymer rubber in the absence of sulfur, which comprises incorporating in the unvulcanized copolymer material from 0.25 to 20 parts, per 100 parts of copolymer, of ortho-chlorobenzotrichloride, and heating the mass to effect vulcanization of the copolymer.

2. A vulcanized butadiene-styrene copolymer rubber obtained by the process of claim 4.

BERNARD M. STURGIS.
ARTHUR A. BAUM.

REFERENCES CITED

The following references are of record in the file of this patent:

UNITED STATES PATENTS

| Number | Name | Date |
|---|---|---|
| 2,504,295 | Beaver | Apr. 18, 1950 |

OTHER REFERENCES

Van der Meer: Rubber Chem. Tech., 18, 853–873 (1945, abstracted in Mark and Proskauer Literature Service, Section B570 (1946).

Certificate of Correction

Patent No. 2,567,135                                                September 4, 1951

BERNARD M. STURGIS ET AL.

It is hereby certified that error appears in the printed specification of the above numbered patent requiring correction as follows:

Column 5, line 9, in the table, first column thereof, for "Zinz" read *Zinc*; column 6, line 70, for "vulcanzation" read *vulcanization*; column 8, line 5, for the claim reference numeral "4" read *1*;

and that the said Letters Patent should be read as corrected above, so that the same may conform to the record of the case in the Patent Office.

Signed and sealed this 22nd day of January, A. D. 1952.

[SEAL]

THOMAS F. MURPHY,
*Assistant Commissioner of Patents.*